United States Patent
Strobel et al.

[11] Patent Number: 5,900,317
[45] Date of Patent: May 4, 1999

[54] FLAME-TREATING PROCESS

[75] Inventors: Mark A. Strobel, Maplewood; Ronald S. Kapaun, Woodbury; Christopher S. Lyons, St. Paul; Seth M. Kirk, Minneapolis, all of Minn.

[73] Assignee: Minnesota Mining & Manufacturing Company, St. Paul, Minn.

[21] Appl. No.: 08/713,320

[22] Filed: Sep. 13, 1996

[51] Int. Cl.⁶ .............................. B32B 27/36; B05D 3/02
[52] U.S. Cl. ........................ 428/412; 428/413; 428/421; 428/423.1; 428/424.2; 428/425.5; 428/446; 428/447; 428/451; 428/474.4; 428/476.3; 428/480; 428/483; 428/500; 427/223; 427/314; 427/372.2; 427/376.2; 427/377; 427/397.7
[58] Field of Search .................................. 428/412, 413, 428/421, 423.1, 424.2, 425.5, 446, 447, 451, 474.4, 476.3, 480, 485, 500; 427/223, 314, 372.2, 376.2, 377, 397.7

[56] References Cited

U.S. PATENT DOCUMENTS

| | | | |
|---|---|---|---|
| 3,153,683 | 10/1964 | Bryan et al. | 264/80 |
| 3,837,891 | 9/1974 | Tietz | 427/224 |
| 3,883,336 | 5/1975 | Randall | 65/17.4 |
| 4,622,237 | 11/1986 | Lori | 427/40 |
| 5,002,804 | 3/1991 | Kubon et al. | 427/224 |
| 5,385,594 | 1/1995 | Kanamori et al. | 65/60.2 |
| 5,576,076 | 11/1996 | Slootman | 427/579 |

FOREIGN PATENT DOCUMENTS

| | | | |
|---|---|---|---|
| 0577447 A1 | 6/1993 | European Pat. Off. | C23C 16/24 |
| 0622474 A1 | 4/1994 | European Pat. Off. | C23C 16/40 |
| 0622474 | 11/1994 | European Pat. Off. | |
| 2713667 | 6/1995 | European Pat. Off. | |
| 2664282 | 7/1990 | France | C08J 7/06 |
| 2670506 | 6/1992 | France . | |
| 4-059344 | 2/1992 | Japan | B29C 71/02 |
| 4-59344 | 2/1992 | Japan | B29C 71/02 |
| 459344 | 2/1992 | Japan . | |
| WO 92/11312 | 7/1992 | WIPO | C08J 7/10 |
| WO 95/16802 | 6/1995 | WIPO | C23C 16/44 |

*Primary Examiner*—Leszek Kiliman
*Attorney, Agent, or Firm*—Roger R. Tamte; Douglas B. Little

[57] ABSTRACT

The present invention provides a method of modifying the surface of a polymeric substrate, e.g., to improve the wettability of the polymer film surface and/or affix silicon-containing structures to the substrate surface, comprising exposing the substrate to a flame. The flame is supported by a fuel and oxidizer mixture that includes at least one silicon-containing compound that functions as a fuel and is in an effective amount for modifying the surface of the polymeric substrate. Also disclosed are substrates with surfaces that are modified by exposing the substrate to a flame that is supported by the process of the invention. Large increases in the ASTM wetting test, e.g., greater than 13 mJ/m² over that reported with conventional flame-treating processes, have been observed in polymeric substrates treated according to this invention.

11 Claims, 2 Drawing Sheets

FLAME-TREATING PROCESS

FIELD OF THE INVENTION

This invention relates to a method of flame treating polymeric substrates to modify the surface properties of the substrate and to articles treated by the method.

BACKGROUND OF THE INVENTION

Flame treating is used to improve the wetting and adhesion properties of polymer film surfaces in general and of polyolefin film surfaces in particular. The most wettable surface-modified polymer films usually have optimal adhesion properties in a variety of practical applications. These enhanced wetting properties result in improved coatability and adhesion of materials such as pressure-sensitive adhesives, primers and low-adhesion release coatings. Enhanced wetting properties are particularly useful in coating water-borne solutions at all film speeds and in coating solvent-borne materials at high coating speeds.

Flame treaters ordinarily use premixed flames, i.e., the fuel and oxidizer are thoroughly mixed prior to combustion and the rate of combustion is controlled by the rate of chemical reaction that occurs in the flame. In a premixed flame, the luminous region is that portion of the flame where the temperature rise is the greatest and where much of the reaction and heat release occur. During a flame-treating process, one side of a polymer film is passed in close proximity to a flame while the other side of the polymer surface generally passes over a cooled support, e.g., a cooled drum, to minimize heat distortion.

Flames are commonly described in terms of two characteristics: by the flame power and by the molar ratio of oxidizer to fuel. The flame power is the product of the volume of fuel burned per unit time and the heat content of the fuel. Typical units for the flame power are W or Btu/hr. In flame treating, the flame power can be normalized to account for the dimensions of the burner, leading to units such as $W/cm^2$ or $Btu/hr\text{-}in^2$. The exact ratio of oxidizer to fuel needed for complete combustion is known as the stoichiometric ratio. For example, the exact amount of dry air necessary for the complete combustion of methane is 9.55 volumes per volume of methane; so the stoichiometric ratio for an air:methane flame is 9.55:1. The equivalence ratio is defined as the stoichiometric oxidizer:fuel ratio divided by the actual oxidizer:fuel ratio. For fuel-lean, or oxidizing, flames, there is more than the stoichiometric amount of oxidizer and so the equivalence ratio is less than 1:1. For oxidizer:fuel mixtures at the stoichiometric ratio, the equivalence ratio is equal to 1:1. For fuel-rich systems, the equivalence ratio is greater than 1:1.

Virtually all industrial flame treaters use a premixed laminar (as opposed to turbulent) flame with air as the oxidizer and a gaseous hydrocarbon as a fuel. Typical hydrocarbon fuels include hydrogen, natural gas, methane, ethane, propane, butane, ethylene, liquefied petroleum gas, acetylene, or blends thereof, and city gas, which is often composed of a mixture of carbon dioxide, carbon monoxide, hydrogen, methane, and nitrogen. Halogen and halogen-containing compounds have also been disclosed as oxidizer:fuel mixture additives to increase the adhesivity of polyolefin films to subsequent coatings.

Recently, hydrocarbon flames enriched with up to 5 percent additional oxygen by volume, up to 5 percent steam by weight and a few parts per million of alkali or alkaline earth metals have demonstrated increases in wetting values on polymer films (American Standard Test Methods (ASTM) standard wetting test) of up to 2 $mJ/m^2$ relative to a non-enriched flame process. Surface modification of a polymer surface has also been reported by flame treatment where a flammable third component that is neither a fuel nor an oxidizer is sprayed into the flame. The listed third components are polymers such as cellulose, protein, silicones or polyethers, and inorganic materials such as carbides, nitrides, metal salts or metal oxides.

Silicon oxide deposits onto polymeric substrates by corona-discharge methods have also been reported. ASTM wetting test values of equal to or greater than 58 $mJ/m^2$ on biaxially oriented polypropylene have been disclosed. However, the corona process is limited by its tendency to perforate thin or porous films, to "strike through" or inadvertently treat the backside of polymer films and to create toxic or corrosive gases. In addition, the silicon oxide-deposition corona process cannot operate in an open atmosphere of air and requires controlled amounts of an oxygen-containing gas such as nitrogen oxide, carbon oxide, water or alcohol to controllably decompose a silicon-containing gas.

Because of the benefit that the increased wettability of polymer surfaces has on the coating industry, there is an ongoing need for processes that improve the wettability of polymer films.

SUMMARY OF THE INVENTION

The present invention provides a method of modifying the surface of a polymeric substrate, e.g., to improve the wettability of the polymer substrate surface and/or affix silicon-containing structures to the substrate surface to alter the reactivity of the surface. The method of the invention comprises exposing the substrate to a flame that is supported by a fuel and oxidizer mixture that includes at least one silicon-containing compound. The latter functions as a fuel substitute, but also has been found to modify the surface of the polymeric substrate. The amount needed to effect a desired surface modification can range from less than 1 molar percent to 100 molar percent, where "molar percent" is equal to 100 times the molar flow of the compound to the flame divided by the sum of the molar flow of the compound and the molar flow of the fuel.

Also disclosed are substrates with surfaces that are modified by exposing the substrate to a flame. The flame is supported by the process of the invention.

Large increases in the ASTM wetting test, e.g., greater than 13 $mJ/m^2$ over that reported with conventional flame-treating processes, have been observed in polymeric substrates treated according to this invention. In addition, significant amounts of silicon-containing chemical groups affixed to polymeric substrate surfaces have been observed.

DETAILED DESCRIPTION OF THE INVENTION

Figure 1:
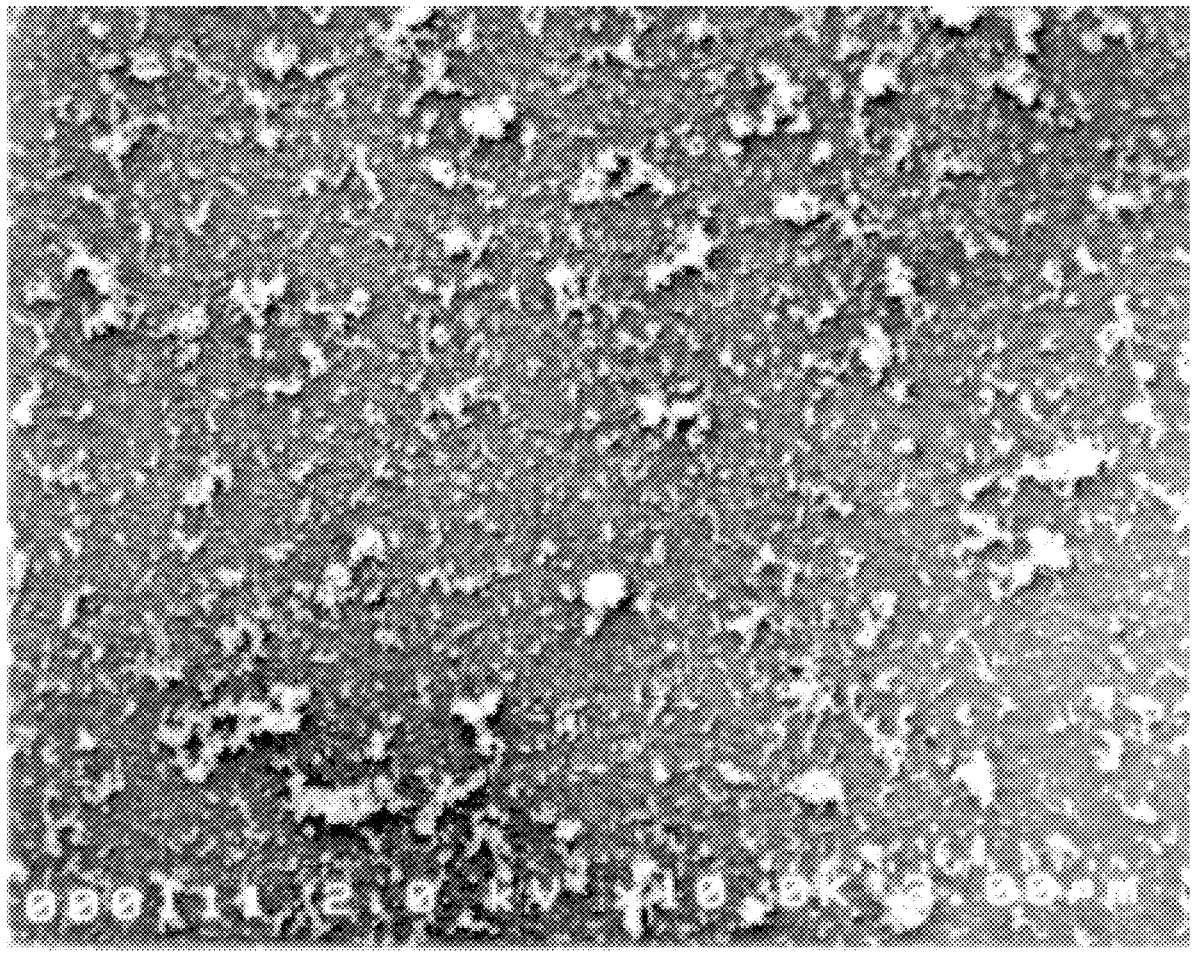
FIG. 1 is a surface view of the modified polypropylene film of Example 3 at 10,000X using scanning electron microscopy (SEM).

The silicon-containing compound that is included in the fuel:oxidizer mixture of a method of the invention typically functions as a fuel and thus is generally a fuel-substitute. The silicon-containing compound is generally a gas, or is a liquid or a solid that can have a significant portion transformed into a vapor to permit premixing into the fuel: oxidizer mixture. Preferably the silicon-containing compound has a vapor pressure at ambient temperature of at least 100 torr.

Essentially all silicon-containing fuel substitutes rapidly decompose in flames to yield silicon atoms or silicon hydrides. In turn, these silicon atoms or silicon hydrides are oxidized to silica ($SiO_2$) in a rapid, essentially irreversible, reaction. In the flame, the reactions $Si+O_2 \rightarrow SiO_2$ or $SiH_4 + O_2 \rightarrow SiO_2 + 2H_2$ are so fast that they can be considered elementary steps. It has been found that silicon-containing structures deposit out of the flame onto the polymeric substrate.

Suitable silicon-containing compounds include silanes, siloxanes, silizanes, silylthioethers and mixtures thereof They may be either cyclic, linear or have a combination of cyclic and linear portions. Also, the silicon-containing compounds have one or more types of groups pendant from the silicon atom. The groups include hydrogen, alkyl and substituted alkyl, aryl and substituted aryl, alkoxy and substituted alkoxy, halogen, amine, and ethylenically unsaturated groups such as vinyl and allyl. A particularly preferred silicon-containing compound is hexamethyldisiloxane, i.e., $(CH_3)_3Si$—O—$Si$—$(CH_3)_3$, because it is of low toxicity, is essentially non-corrosive and non-pyrophoric, and is available in large quantities at a high purity and a low cost. Even though hexamethyldisiloxane is a liquid rather than a gas at room temperature, the listed advantages far outweigh the additional step to vaporize the liquid to include it in the fuel oxidizer mixture.

The effective amount of silicon-containing compound needed to effect a modification of the surface of the polymer substrate can be less than one molar percent up to 100 molar percent and will depend on the silicon-containing compound used and the effects desired. The amount of silicon-containing compound used is expressed in terms of molar percent which is defined as 100 times the molar flow of the silicon-containing compound divided by the sum of the molar flow of the silicon-containing compound and the molar flow of the fuel. If all of the fuel were replaced with such a silicon-containing compound, the molar percent of the silicon-containing compound would be 100 percent. Surprisingly, increases in wetting values for biaxially oriented polypropylene films of over 13 $mJ/m^2$ have been achieved for amounts of silicon-containing compounds ranging from less than one molar percent to 100 molar percent.

The optimal concentrations of oxidizer, fuel and silicon-containing compound in the oxidizer:fuel:silicon-containing compound mixture are determined by calculating the stoichiometric ratio of the blend and experimentally determining the equivalence ratio that is optimal for the particular materials used. Typically, the accuracy of the equivalence ratio is with in 0.02 of the recorded value. First, the stoichiometric ratio of oxidizing material to oxygen-reactive material, or the oxidizer to fuel, is calculated for the complete combustion of the materials in the oxidizer:fuel:silicon-containing compound mixture. Then the optimal equivalence ratio, defined as the stoichiometric oxidizer:fuel ratio divided by the actual oxidizer:fuel ratio that results in optimal surface modification, is experimentally determined. For example, the stoichiometric ratio for the combustion of hexamethyldisiloxane by air in the presence of methane is 57.3: 1, based on the reaction: $Si_2C_6H_{18}O+12O_2 \rightarrow 6CO_2+9H_2O+2SiO_2$ and a molar concentration of oxygen in dry air of 20.95 percent, and the optimal equivalence ratio covers a broad range from below 0.90 to above 1.20, within the limits of the test. If liquids were used with surface tensions significantly greater than that of water, i.e., greater than 72 mN/m, the optimum equivalence ratio may be more specific. However, a major benefit of increasing the wetting values of polymeric films is to obtain better wetting of water-based coatings.

Flame-treating equipment useful for the invention is any that can provide a flame in close proximity to the polymeric substrate surface, thus modifying the characteristics of the polymer surface. Generally, when the polymeric substrate is a film, the film surface is flame-treated as the film passes over a cooled support, e.g., a cooled roll, to prevent film distortion. However, cooling rolls are not necessary. For example, the film may be sufficiently cooled by being suspended between two supports. Flame-treating equipment includes commercial systems manufactured by, for example, The Aerogen Company, Ltd., Alton, United Kingdom, and Sherman Treaters Ltd., Thame, United Kingdom. Preferably the equipment has a mixer to combine the oxidizer and fuel before they feed the flame used in the flame-treating process of the invention. A ribbon burner is best suited for the flame treatment of polymer films, but other types of burners may also be used.

The flame has an optimal distance from the polymeric substrate surface and is supported by mixture of oxidizer and fuel. The distance between the tip of the luminous cone of the flame and the surface of the polymeric substrate has an effect on the degree of surface-property enhancement that is observed. Generally, useful distances are less than 30 mm and can be as low as $-2$ mm, i.e., the film is contacted by the flame and occupies space that would otherwise comprise the terminal 2 mm of the flame tip. Preferably the distance is between 0 mm and 10 mm and more preferably between 0 mm and 2 mm. The fuel has a lower electronegativity than the oxidizer. Suitable fuels include, for example, natural gas, methane, ethane, propane, butane, ethylene, liquefied petroleum gas, acetylene or blends thereof The oxidizer reacts exothermically with the fuel to form chemical species that are more thermodynamically stable. Suitable oxidizers are air and oxygen-enriched air.

The invention is useful with a wide range of polymeric substrates that can have silicon-containing structures affixed to them. The polymeric substrates can be of any shape that permits surface modification by flame treatment and include, for example, films, sheets, molded shapes, machined or fabricated parts, porous or nonwoven materials, three-dimensional objects, foams, fibers and fibrous structures. Such polymeric substrates include, for example, polyolefins, such as polyethylene, polypropylene, polybutylene, polymethylpentene; mixtures of polyolefin polymers and copolymers of olefins; polyolefin copolymers containing olefin segments such as poly(ethylene vinylacetate), poly(ethylene methacrylate) and poly(ethylene acrylic acid); polyesters, such as poly(ethylene terephthalate), poly(butylene phthalate) and poly(ethylene naphthalate); acetates such as cellulose acetate, cellulose triacetate and cellulose acetate/butyrate; polyamides such as poly(hexamethylene adipamide); polyurethanes; polycarbonates; acrylics such as poly(methyl methacrylate); polystyrenes and styrene-based copolymers; vinylics such as poly(vinyl chloride), poly (vinylidone dichloride), poly(vinyl alcohol) and poly(vinyl butyral); ether oxide polymers such as poly(ethylene oxide) and poly(methylene oxide); ketone polymers such as polyetheretherketone; silicones such as polydiorganosiloxane-based elastomers; epoxies; polyimides; fluoropolymers such as polytetrafluoroethylene; mixtures thereof, or copolymers thereof.

Polymeric substrates modified by the flame-treating process where the flames are supported by the silicon-containing compounds are unique. These modified substrates exhibit superior wettability over that reported for polymeric substrates treated by other flame-treating processes or by corona or plasma processes. Examination of the surfaces using ESCA indicates that the silicon on the surface is generally in the form of silica ($SiO_2$). Further examination of the surface using scanning electron microscopy at magnifications of from 10,000X to 100,000X shows that the silica is in the form of dendritic (i.e., coral-like) structures of 0.1 to 5.0 $\mu$m size and deposited uniformly on the PP surfaces. Samples that had a 13 $MJ/M^2$ increase in wetting values typically had at least 5 percent of the polymeric surface covered with the dendritic structures. The dendritic structures are, in turn, comprised of agglomerated individual silica particles of about 30 to 100 nm diameter.

Polymeric substrate surfaces that are more wettable or have silicon-containing structures affixed to them are useful in the coating industry. Polymeric substrate surfaces that are more wettable generally permit a more intimate contact with subsequent coating solutions, suspensions or dispersions and thus cause them to be more easily coated onto the polymeric substrate surface. The improved contact also often results in improved adhesion between the polymeric substrate surface and the coating once the coating is dried. Polymeric substrate surfaces that are affixed with silicon functionality are generally more reactive toward some chemical species and less reactive toward others. This reactivity can be beneficial depending on the application.

This invention is further illustrated by the following examples which are not intended to limit the scope of the invention. The following test methods were used to evaluate and characterize film surfaces produced in the examples.

ASTM D-2578-84 Wetting Test

Measurement of the wetting tension of a polymer film surface is made by wiping a series of liquids of different surface tensions over different regions of the surface of a polymer film sample. The wetting tension of the film surface is approximated by the surface tension of the liquid that just wets the film surface. The untreated polypropylene films used in this study had an ASTM wetting test value of 29 $mJ/m^2$. The typical standard deviation for the ASTM wetting test was ±2 $mJ/m^2$. Results are the average of six samples unless otherwise noted.

Advancing and Receding Contact Angles

Measurements of the advancing and receding contact angles in air of deionized, filtered water were made using the Wilhelmy plate method on a Cahn DCA-322 dynamic contact-angle instrument. The surface tension of the water was measured as 72.6 mN/m at 21° C. using the microbalance. A three-layer laminate was prepared using SCOTCH BRAND™ No. 666 double-coated tape to mount the treated sides of the film outward. To prevent contamination during the preparation of this laminate, the treated surfaces contacted only untreated polypropylene film. This situation is analogous to the common practice of winding modified film into roll form after treatment. The laminate was cut into a 2.54×2.54 cm square for analysis. The stage speed was 49.8 $\mu$m/s with a travel distance of about 1 cm. The advancing and receding contact angles were calculated using a software routine supplied with the Cahn instrument that uses linear-regression for the buoyancy correction. Typical standard deviations for the contact-angle measurements were 2–3°.

Surface Composition Determination

X-ray photoelectron spectroscopy (XPS or ESCA) spectra were obtained on a Hewlett-Packard Model 5950B spectrometer using a monochromatic $AIK_\alpha$ photon source at an electron take-off angle with respect to the surface of 38°. Spectra were referenced with respect to the 285.0 eV carbon 1s level observed for hydrocarbon. From the ESCA spectra, O/C and Si/C atomic ratios were obtained. The typical standard deviation of the O/C and Si/C atomic ratios obtained from ESCA was ±0.02.

Removal Force

A film surface to be tested is coated with a water dispersion of 95 : 5 isooctyl acrylate : acrylic acid copolymer, and water is evaporated to prepare an adhesive-coated film. The adhesive layer has a thickness of about 20 $\mu$m. The adhesive-coated film is then conditioned at approximately 20° C. and approximately 50 percent relative humidity for about 24 hours. Strips of the adhesive-coated film about 1.25 cm wide and about 15 cm long were cut, one end of the strip was bent to form a non-tacky tab and the remainder of the strip was adhered to an anodized aluminum plate by rolling the strips with a 1 kg (2.2 lb.) roller using two passes to insure intimate contact. Each sample strip was removed from the aluminum plate by using a Model 3M90 slip/peel tester, available from Instrumentors, Inc., in 90° geometry at 230 cm/min. The removal force needed to remove the film from the adhesive coating was measured in N/cm. Results are the average of six samples.

Examples 1–6 and Comparative Examples C1–C2

In Example 1, an oxidizer composed of dust-filtered, 25° C. compressed air with a dew point of <−10° C. was premixed with the components of a fuel mixture composed of 99.4 molar percent of a natural gas fuel (having a specific gravity of 0.577, a stoichiometric ratio for dry air: natural gas of 9.6:1, and a heat content of 37.7 kJ/L) and 0.6 molar percent of a silicon-containing compound (hexamethyldisiloxane fuel substitute with a stoichiometric ratio for dry air: hexamethyldisiloxane of 57.3:1 and a heat content of 226 kJ/L).

The flows of the air and natural gas were measured with Brooks Instrument Model 5812 (8–400 Lpm) and Brooks Instrument Model 5811 (1–50 Lpm), respectively. These mass flowmeters were calibrated using in-line Rockwell International cumulative-flow meters that operated on the displacement principle. The air and natural gas flows were controlled with control valves from Badger Meter Inc., of Tulsa, Okla. The flow of gaseous hexamethyldisiloxane was produced using a vaporizer system in which liquid hexamethyldisiloxane was evaporated in a vaporization chamber, collected, and mixed with the air stream. The vaporization chamber consisted of an enclosed 13 cm diameter, 14 cm tall aluminum cylinder that was attached to an electric resistance-heating element. The temperature of the heating element was regulated by an electronic temperature controller. A Model 22 syringe pump, available from Harvard Apparatus, South Natick, Mass., was used to introduce the liquid hexamethyldisiloxane into the vaporization chamber through a small-bore stainless steel tube that terminated at a piece of NEXTEL™ high-temperature fabric, available from 3M Company, located at the bottom of the chamber. The air stream entered the vaporization chamber after passage through the flow metering and control equipment. This air stream exited the vaporization chamber carrying the evaporated hexamethyldisiloxane, then passed through a coil of stainless steel tubing immersed in a room-temperature water bath, which cooled the hexamethyldisiloxane-laden air to near room-temperature. Finally, the hexamethyldisiloxane-laden air was mixed with the natural gas fuel in a venturi mixer, Flowmixer Model 88-9 available from Pyronics Inc., Cleveland, Ohio, to form a combustible mixture.

All flows were adjusted to result in a flame equivalence ratio of 0.97 and a normalized flame power of 500 W/cm$^2$. To generate the desired molar flow of hexamethyldisiloxane, the flow of liquid hexamethyldisiloxane injected by the syringe into the vaporization chamber was 1.6 mL/min, which was calculated from the molecular weight of hexamethyldisiloxane (162.38 g/mole) and the density of the liquid hexamethyldisiloxane (0.764 g/niL).

From the venturi mixer, the combustible mixture passed through a 3 m long pipe to a ribbon burner, a 35 cm×1 cm stainless steel ribbon mounted in a cast-iron housing and available as Part No. FMB-206 from The Aerogen Company Ltd., Alton, United Kingdom. The burner was mounted at the 6 o'clock position beneath a 25 cm diameter, 40 cm face-width, AISI 1020 medium-carbon steel chill roll coated with 0.35 mm of an ARCOTHER™ TC-100 ceramic coating available from American Roller Company, Kansasville, Wis. The chill roll was water cooled to 30° C. An electric spark ignited the combustible mixture. Stable conical flames were formed with tips 2–3 mm above the uppermost surface of the ribbon burner. Thermally extruded, biaxially oriented 0.04 mm (1.6 mil) thick, 30 cm wide homopolymer polypropylene (PP) film, moving at 125 m/min, was guided by idler rolls to wrap around the bottom half of the chill roll. The distance between the uppermost surface of the ribbon burner and the chill roll was adjusted to maintain a distance of 1±1 mm between the tips of the luminous stable flame cones and the surface of the polypropylene film. To insure intimate contact between the substrate and the chill roll, a 10 cm diameter, 40 cm face-width nip roll, covered with 80–90 durometer urethane rubber and available from American Roller Company, was located at the 9 o'clock position on the input side of the chill roll. The front side of the PP film was flame treated by exposure to a laminar premixed flame while the backside was cooled by contact with the chill roll. The actual zone of reactive product gases was somewhat wider than the ribbon-burner downweb dimension of 1 cm. In fact, the plume of reactive product gases tended to be about 4 cm in the downweb direction. Using this value as the dimension of the visible flame, the exposure time of the polypropylene film to the flame was about 0.02 seconds.

In Examples 2–6, polypropylene films were flame treated as in Example 1 except that the fuel mixtures contained different amounts of hexamethyldisiloxane (HMDSO) ranging from 1.0 molar percent to 100.0 molar percent and the flame equivalence ratio was varied from 0.90 to 1.20, as listed in Table 1. In Comparative Example C1, polypropylene film was not flame treated. In Comparative Example C2, polypropylene film was flame treated as in Example 1 except that the fuel mixture contained only natural gas.

All film samples were tested with the ASTM wetting test and select films were with the advancing and receding contact-angle test and ESCA. The results are in Table 1.

TABLE 1

| Example | HMDSO (Percent) | Equivalence Ratio | Wetting (mJ/m$^2$) | Advancing Angle (Degrees) | Receding Angle (Degrees) | ESCA O/C Ratio | ESCA Si/C Ratio |
|---|---|---|---|---|---|---|---|
| C1 | none | — | 29 | 117 | 85 | 0.00 | 0.00 |
| C2 | none | — | 61 | 89 | 28 | 0.11 | 0.00 |
| 1 | 0.6 | 0.97 | ≧72 | 83 | 0 | 0.14 | 0.055 |
| 2 | 1.0 | 0.90 | ≧72 | 76 | 0 | 0.11 | 0.04 |
| 3 | 1.0 | 0.97 | ≧72 | — | — | — | — |
| 4 | 1.0 | 1.04 | ≧72 | — | — | — | — |
| 5 | 1.0 | 1.20 | ≧72 | — | — | — | — |
| 6 | 100.0 | 1.00 | ≧72 | — | — | — | — |

As seen in Table 1, the wettability of polypropylene treated in a pure natural gas flame was 61 mJ/m$^2$, while the wettability of the polypropylene films treated with hexamethyldisiloxane added to the flames were all consistently equal to or greater than 72 mJ/m$^2$ over the entire range of hexamethyldisiloxane concentrations from less than 1.0 molar percent to 100 molar percent. It is surprising that any amount of hexamethyldisiloxane added to the flame results in such a large enhancement in wettability. It is even more surprising that this occurs over such a wide range of hexamethyldisiloxane concentrations. This wetting enhancement was also observed over a broad range of flame equivalence ratios from 0.90 to 1.20.

The superior wettability of the PP film treated in hexamethyldisiloxane-containing flames is shown by the extremely low receding contact angles of water obtained with these samples. No other types of flame treatments generate 0 degree receding contact angles of water on PP film.

Figure 2:
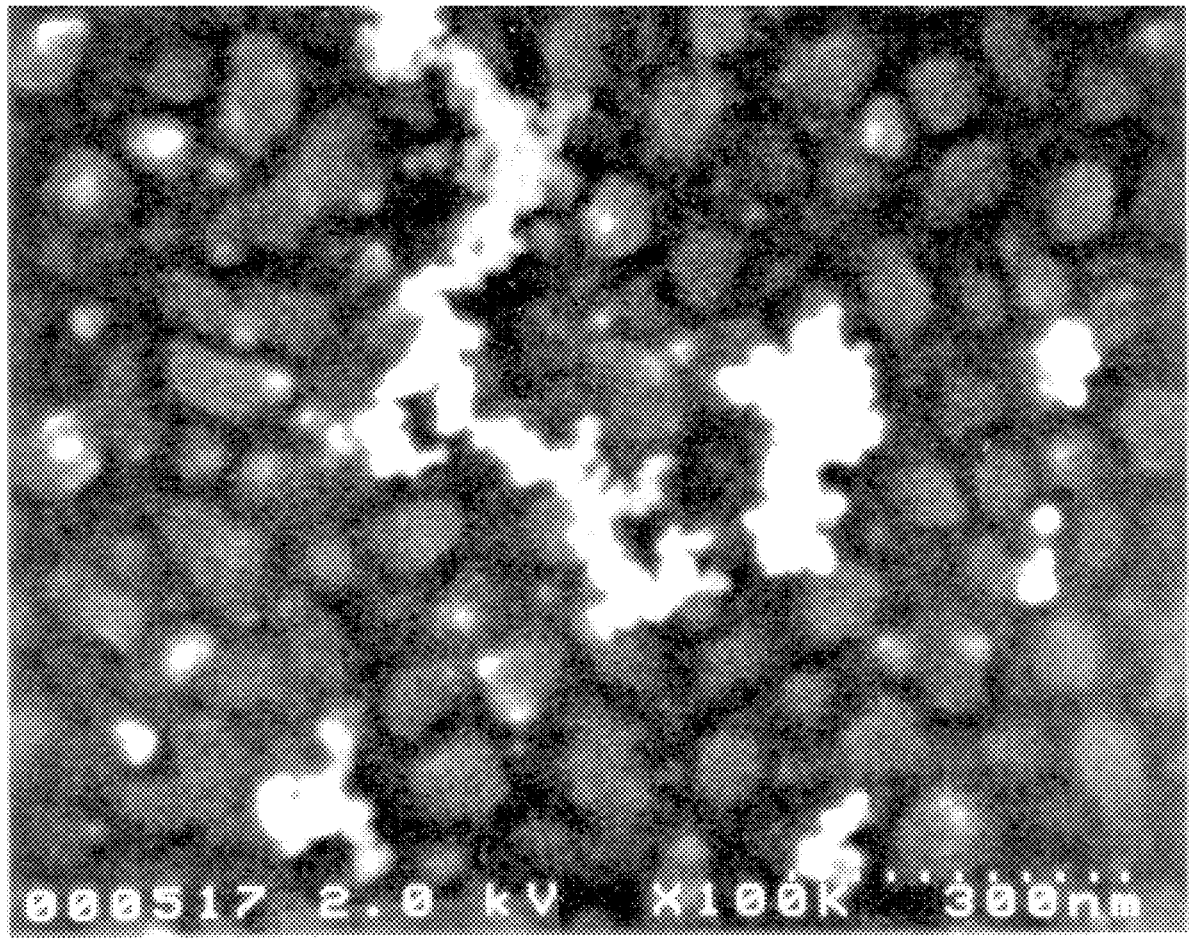
FIG. 2 is surface view of the modified polypropylene film of Example 3 at 100,000X using a scanning electron microscopy (SEM).

The ESCA Si/C atomic ratios of the flame-treated films show that silicon is affixed to the surface of those films treated in hexamethyldisiloxane-containing flames. ESCA indicates that this silicon is in the form of silica ($SiO_2$). FIG. 1 and FIG. 2 show that the silica is in the form of dendritic (i.e., coral-like) structures of 0.1 to 5.0 μm size and deposited uniformly on the PP surfaces. The dendritic structures are, in turn, comprised of agglomerated individual silica particles of about 30 to 100 nm diameter.

Adhesion of Silicon Treatment to Film

The samples from Examples 1 and 3 were further tested by exposing the treated PP films to 30 minutes of washing with water in an ultrasonic bath held at 50° C. Following the washing, the samples were allowed to dry and then were retested. No significant changes in the ASTM wetting-test values, advancing or receding contact angles or ESCA atomic ratios were observed. Also, no visible changes is the SEM photomicrographs were observed. Thus, this silicon treatment test shows that the silicon-containing structures affixed to the surface of the treated PP film have strong adhesion to the film surface.

Removal Force of Adhesive Coating from Modified Film

The samples of Example 1 and Comparative Examples C1 and C2 were further tested for the force to remove an adhesive coating from the film. For Example 2 the removal force was 6 N/cm, while for Comparative Examples C1 and C2 the removal force was 2 N/cm and 4 N/cm, respectively. These results show that treatment of PP films in hexamethyldisiloxane-containing flames led to better adhesion properties than those obtained with PP films not flame treated or treated in standard hydrocarbon flames.

Example 7 and Comparative Examples C3 and C4

The polymer film of Example 7 was flame treated as in Example 2 except the film was 0.1 mm (4 mil) thick biaxially oriented poly(ethylene terephthalate). In Comparative Example C3, biaxially oriented poly(ethylene terephthalate) film was not flame-treated. In Comparative Example C4, biaxially oriented poly(ethylene terephthalate) film was flame treated as the polypropylene film in Comparative Example C2. All film samples were tested with the ASTM wetting test and the advancing and receding contact-angle test. The results are shown in Table 2.

TABLE 2

| Example | Wetting (mJ/m$^2$) | Advancing Angle (Degrees) | Receding Angle (Degrees) |
|---------|--------------------|---------------------------|--------------------------|
| C3      | 42                 | 86                        | 50                       |
| C4      | ≧72                | 49                        | 13                       |
| 7       | ≧72                | 45                        | 0                        |

As seen with both flame-treated film samples, unlike with polypropylene film, the wettability of the poly(ethylene terephthalate) films was increased by flame treatment to values in excess of 72 mJ/m$^2$. However, the addition of silicon-containing additive further increased the wettability of the films as shown by the lower advancing angle and the previously unreported elimination of substantially all of the receding contact angle.

The various modifications and alterations of this invention will be apparent to those skilled in the art without departing from the scope and spirit of this invention and this invention should not be restricted to that set forth herein for illustrative purposes only.

We claim:

1. A method of modifying a polymeric substrate, comprising exposing the polymeric substrate to a flame where the flame is supported by a fuel and oxidizer mixture that includes at least one silicon-containing compound introduced into the flame as a vapor and functioning as a fuel substitute.

2. The method of claim 1 wherein the silicon-containing compound is selected from silanes, siloxanes, silizanes, silylthioethers and mixtures thereof wherein, the silicon atoms have at least one type of pendant group selected from hydrogen, alkyl and substituted alkyl, aryl and substituted aryl, alkoxy and substituted alkoxy, halogen, amine, and ethylenically unsaturated groups such as vinyl or allyl.

3. The method of claim 2 wherein the silicon-containing compound is hexamethyldisiloxane.

4. The method of claim 1 wherein the polymer substrate is a polyolefin, a mixture of polyolefin polymers, a copolymer of olefins, a polyolefin copolymer containing olefin segments, a polyester, an acetate, a polyamide or a mixture of polyamides, a polyurethane, a polycarbonate, an acrylic, a polystyrene or styrene-based copolymer, a vinylic, an ether oxide polymer, a ketone polymer, a silicone, an epoxy, a polyimide, a fluoropolymer, a mixture thereof or a copolymer thereof.

5. The method of claim 4 wherein the polymer substrate is polyethylene, polypropylene, polybutylene, polymethylpentene, poly(ethylene vinylacetate), poly (ethylene methacrylate), poly(ethylene acrylic acid), poly (ethylene terephthalate), poly(butylene phthalate), poly (ethylene naphthalate), cellulose acetate, cellulose triacetate, cellulose acetate/butyrate, poly(hexamethylene adipamide), polyurethane, polycarbonate, poly(methyl methacrylate), polystyrene, styrene-based copolymer, poly(vinyl chloride), poly(vinyl dichloride), poly(vinyl alcohol), poly(vinyl butyral), poly(propylene oxide), poly(ethylene oxide), poly (methylene oxide), polyetheretherketone, polydiorganosiloxane, polytetrafluoroethylene, mixture thereof or copolymer thereof.

6. A modified polymeric substrate with improved wettability of the polymeric substrate surface and/or affixation of silicon-containing compound to the surface, made by the method of claim 1.

7. The modified polymeric substrate of claim 6 wherein the film is a polyolefin, a mixture of polyolefin polymers, a copolymer of olefins, a polyolefin copolymer containing olefin segments, a polyester, an acetate, a polyamide or a mixture of polyamides, a polyurethane, a polycarbonate, an acrylic, a polystyrene or styrene-based copolymer, a vinylic, an ether oxide polymer, a ketone polymer, a silicone, an epoxy, a polyimide, a fluoropolymer, a mixture thereof or a copolymer thereof.

8. The modified polymeric substrate of claim 7 wherein the polymer substrate is polyethylene, polypropylene, polybutylene, polymethylpentene, poly(ethylene vinylacetate), poly(ethylene methacrylate), poly(ethylene acrylic acid), poly(ethylene terephthalate), poly(butylene phthalate), poly(ethylene naphthalate), cellulose acetate, cellulose triacetate, cellulose acetate/butyrate, poly (hexamethylene adipamide), polyurethane, polycarbonate, poly(methyl methacrylate), polystyrene, styrene-based copolymer, poly(vinyl chloride), poly(vinyl dichloride), poly(vinyl alcohol), poly(vinyl butyral), poly(propylene oxide), poly(ethylene oxide), poly(methylene oxide), polyetheretherketone, polydiorganosiloxane, polytetrafluoroethylene, mixture thereof or copolymer thereof.

9. The modified polymeric substrate of claim 6 wherein the silicon-containing compound is selected from silanes, siloxanes, silizanes, silylthioethers and mixtures thereof wherein the silicon atoms have at least one type of pendant group selected from hydrogen, alkyl and substituted alkyl, aryl and substituted aryl, alkoxy and substituted alkoxy, halogen, amine, and ethylenically unsaturated groups such as vinyl or allyl.

10. The modified polymeric substrate of claim 9 wherein the silicon-containing compound is hexamethyldisiloxane.

11. A method of claim 1 in which the silicon-containing compound is premixed as a vapor with an oxidizer prior to introduction into the flame.

* * * * *

UNITED STATES PATENT AND TRADEMARK OFFICE
CERTIFICATE OF CORRECTION

PATENT NO.   : 5,900,317                                      Page 1 of 1
DATED         : May 4, 1999
INVENTOR(S) : Mark A. Strobel, Ronald S. Kapaun, Christopher S. Lyons, Seth M. Kirk It is certified that error appears in the above-identified patent and that said Letters Patent is hereby corrected as shown below:

Column 5,
Line 14, "MJ/M$^2$" should read -- mJ/m$^2$ --.

Column 8,
Line 9, after "are" insert -- shown --.

Column 9,
Line 1, "2" should read -- 1 --.
Line 50, "wherein," should read -- wherein --.

Column 10,
line 21, "compound" should read -- structures --.

Signed and Sealed this

Thirty-first Day of July, 2001

Attest:

NICHOLAS P. GODICI
Attesting Officer    Acting Director of the United States Patent and Trademark Office